United States Patent
Dutta

(10) Patent No.: US 11,178,544 B2
(45) Date of Patent: Nov. 16, 2021

(54) IMAGE CAPTURE FOR IDENTITY VERIFICATION AND RECORDATION

(71) Applicant: The Western Union Company, Englewood, CO (US)

(72) Inventor: Ranobroto Dutta, Montvale, NJ (US)

(73) Assignee: The Western Union Company, Denver, CO (US)

( * ) Notice: Subject to any disclaimer, the term of this patent is extended or adjusted under 35 U.S.C. 154(b) by 746 days.

(21) Appl. No.: 15/433,258

(22) Filed: Feb. 15, 2017

(65) Prior Publication Data

US 2018/0234667 A1 Aug. 16, 2018

(51) Int. Cl.
| | |
|---|---|
| H04W 12/06 | (2021.01) |
| G06K 9/22 | (2006.01) |
| H04N 7/18 | (2006.01) |
| G06K 9/00 | (2006.01) |
| H04L 29/06 | (2006.01) |
| G06F 16/51 | (2019.01) |
| G06F 16/583 | (2019.01) |
| G06K 9/18 | (2006.01) |

(52) U.S. Cl.
CPC ............ *H04W 12/06* (2013.01); *G06F 16/51* (2019.01); *G06F 16/5838* (2019.01); *G06K 9/00442* (2013.01); *G06K 9/00979* (2013.01); *G06K 9/183* (2013.01); *G06K 9/22* (2013.01); *H04L 63/0861* (2013.01); *H04N 7/183* (2013.01); *G06K 2209/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0332390 | A1* | 12/2010 | Paintin | G06Q 20/10 705/44 |
| 2013/0024371 | A1* | 1/2013 | Hariramani | G06Q 20/36 705/41 |

* cited by examiner

*Primary Examiner* — Samuel D Fereja
(74) *Attorney, Agent, or Firm* — Kilpatrick Townsend & Stockton, LLP

(57) ABSTRACT

Methods for capturing an image for identity verification and recordation are provided. The methods may include receiving, at a specialized processing device, transfer data from a remote terminal. The methods may include determining, based on the transfer data, that an identity verification process is required to execute the transfer data. The methods may include sending, based on a determination that the identity verification process is required, a first image file to the terminal for display. The methods may include receiving from a mobile device, information derived from the first image file which identifies the transfer data and a second image file. The methods may include determining, whether the second image file meets a predefined criteria associated with the transfer data identified by the information derived from the first image file. The methods may include sending an authorization signal upon determining that the second image file meets the criteria.

20 Claims, 3 Drawing Sheets

IMAGE CAPTURE FOR IDENTITY VERIFICATION AND RECORDATION

BRIEF DESCRIPTION OF THE INVENTION

In one embodiment, a method for capturing an image for identity verification and recordation is provided. The method may include receiving, at a specialized processing device, transfer data from a remote terminal. The method may also include determining, with the specialized processing device, based on the transfer data, that an identity verification process is required to execute the transfer data. The method may further include sending, from the specialized processing device, based on a determination that the identity verification process is required, a first image file to the remote terminal for display at the remote terminal. The method may additionally include receiving, at the specialized processing device from a mobile device, information derived from the first image file which identifies the transfer data and a second image file. The method may moreover include determining, with the specialized processing device, whether the second image file meets at least one predefined criteria associated with the transfer data identified by the information derived from the first image file. The method may furthermore include sending, from the specialized processing device, an authorization signal upon a determination by the specialized processing device that the second image file meets at least one predefined criteria associated with the transfer data.

In another embodiment, a system for capturing an image for identity verification and recordation is provided. The system may include a specialized processing device configured to perform a method. The method may include receiving, at the specialized processing device, transfer data from a remote terminal. The method may also include determining, with the specialized processing device, based on the transfer data, that an identity verification process is required to execute the transfer data. The method may further include sending, from the specialized processing device, based on a determination that the identity verification process is required, a first image file to the remote terminal for display at the remote terminal. The method may additionally include receiving, at the specialized processing device from a mobile device, information derived from the first image file which identifies the transfer data and a second image file. The method may moreover include determining, with the specialized processing device, whether the second image file meets at least one predefined criteria associated with the transfer data identified by the information derived from the first image file. The method may furthermore include sending, from the specialized processing device, an authorization signal upon a determination by the specialized processing device that the second image file meets at least one predefined criteria associated with the transfer data.

In another embodiment, a non-transitory machine readable medium having instructions stored thereon for capturing an image for identity verification and recordation is provided. The instructions may be executable by at least one processor to perform a method. The method may include receiving transfer data from a remote terminal. The method may also include determining, based on the transfer data, that an identity verification process is required to execute the transfer data. The method may further include sending, based on a determination that the identity verification process is required, a first image file to the remote terminal for display at the remote terminal. The method may additionally include receiving from a mobile device information derived from the first image file which identifies the transfer data and a second image file. The method may moreover include determining whether the second image file meets at least one predefined criteria associated with the transfer data identified by the information derived from the first image file. The method may furthermore include sending an authorization signal upon a determination that the second image file meets at least one predefined criteria associated with the transfer data.

BRIEF DESCRIPTION OF THE DRAWINGS

The present invention is described in conjunction with the appended figures.

Figure 1:
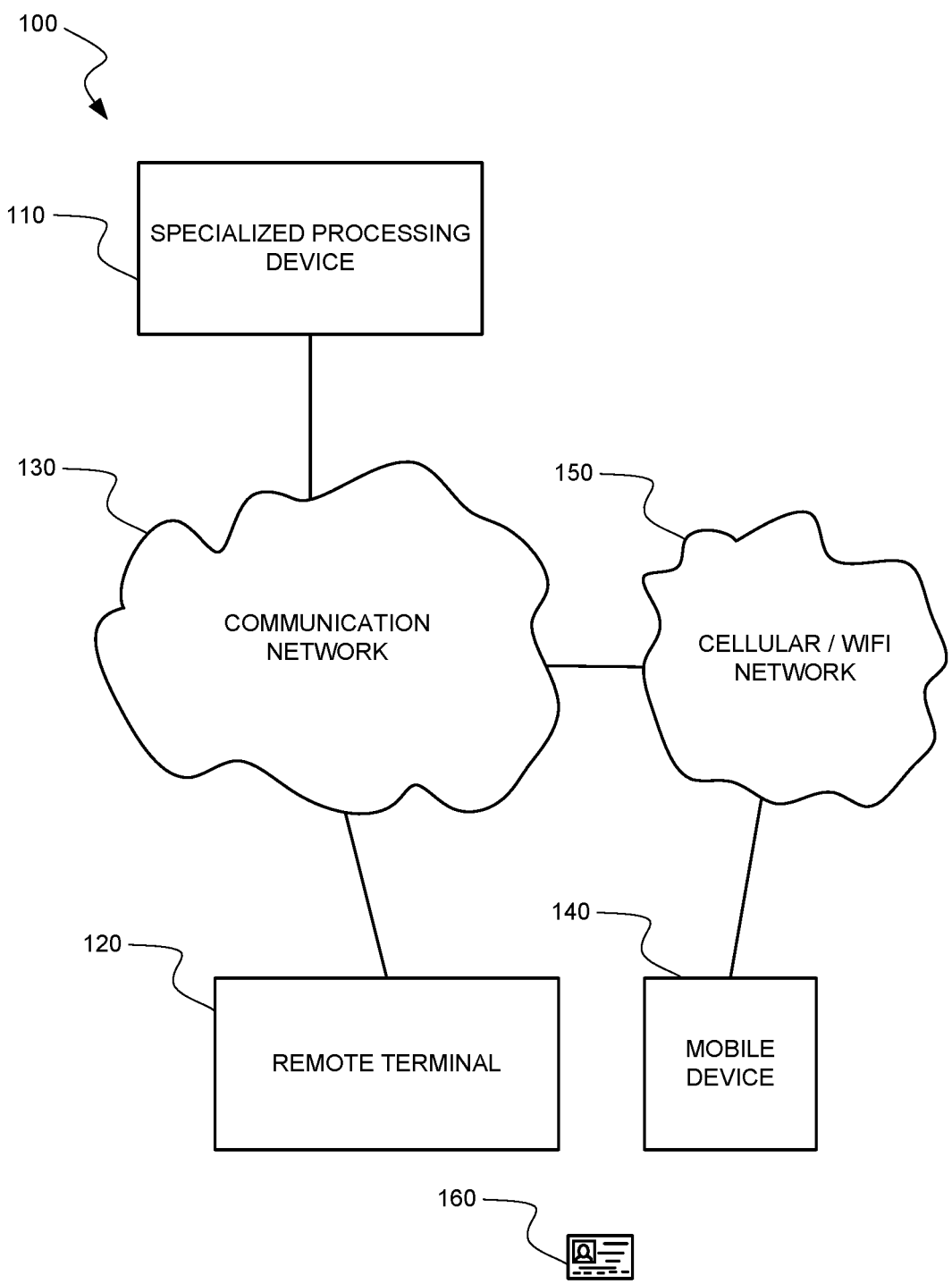
FIG. 1 is a schematic view of one system embodiment of the invention for capture of images used in identity verification and recordation.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to an embodiment herein shall be an implicit recognition that such detail may or may not be present in any version of any embodiment discussed herein by way of negative limitation.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Turning now to FIG. 1, a schematic view of one system embodiment of the invention is shown. System 100 may include a specialized processing device 110, a remote terminal 120 in communication with specialized processing device 110 via communication network 130, and a mobile device 140 in communication with the remainder of system 100 via cellular network 150.

The purpose of system 100 may be to determine whether verification and/or recordation of a government issued identification document 160 is necessary in relation to transfer data. The transfer data may be associated with various processes including the transfer of funds to and/or from a holder of identification document 160, a security and/or access-right check of the holder of identification document 160, or any other process where verification and/or recordation may be necessary in relation to the transfer data. In some embodiments, verification and/or recordation of information regarding the holder and/or identification document may be necessary due to internal system constraints and/or constraints established by external systems.

Specialized processing device 110 may be a customized and/or particular computer processing device configured to handle heavy transaction loads during times when many identification documents are sought to be associated with transfer data. While some components of specialized processing device 110 may be conventional, such as the components discussed below with respect to FIG. 3, overall construction and configuration of specialized processing device 110 may require customization to handle the tasks described herein in relation to the general and/or particular tasks for which the system is employed.

Remote terminal 120 may be an end user terminal configured to facilitate interaction of a user with specialized processing device 110. In some embodiments, the user may be security personnel, the agent of a financial transaction system, and/or any other person for whom the services of specialized processing device 110 are useful. Remote terminal 120 may consequently be a conventional computing device, a specialized computing device such as point-of-sale device, or some other configuration depending on the application of the underlying technology of embodiments of the invention.

Communication network 130 may be any network which facilitates communication between specialized processing device 110 and remote terminal 120. In some embodiments communication network 130 may be an external network such as the Internet, while in other embodiments, communication network 130 may be an internal, potentially private, network. In some embodiments combinations of the two may be possible.

Mobile device 140 may be any portable electronic device which includes a camera or other imaging device capable of implementing embodiments of the invention discussed herein. In some embodiments mobile device 140 may be a mobile phone such a cellular or smart phone, a tablet computing device such as an iPad™ or Microsoft Surface™, a wearable computing device, a notebook or laptop computing device, and or other similarly equipped device.

Mobile device 140 may communicate with specialized processing device 110 via cellular network 150 and/or some other communication network including IEEE 802.11 wireless networks, other wireless networks, and/or available wired networks. While FIG. 1 shows mobile device 140 communicating with specialized processing device 110 via connection through cellular network 150 and communication network 130, any other communication medium, mediums, and/or routing may be employed depending on the particular embodiment.

Identification document 160 may be a government or privately issued identification document which allows for verification that the holder is the person described on the card, and/or which includes particulars of the holder such as name, date of birth, identifying number (e.g., Social Security Account Number, driver's license number, employee number, etc.), physical characteristics (e.g., eye color, height, weight, gender, ethnicity, etc.), etc. Identification document 160 may also include biographic information regarding the document itself such as issuance date and expiration date. In some embodiments, identification document 160 may be any document containing information regarding the holder and/or accounts associated with the holder. For example, bank statements and other account documents of any type may be used, depending on the embodiment.

Figure 2:
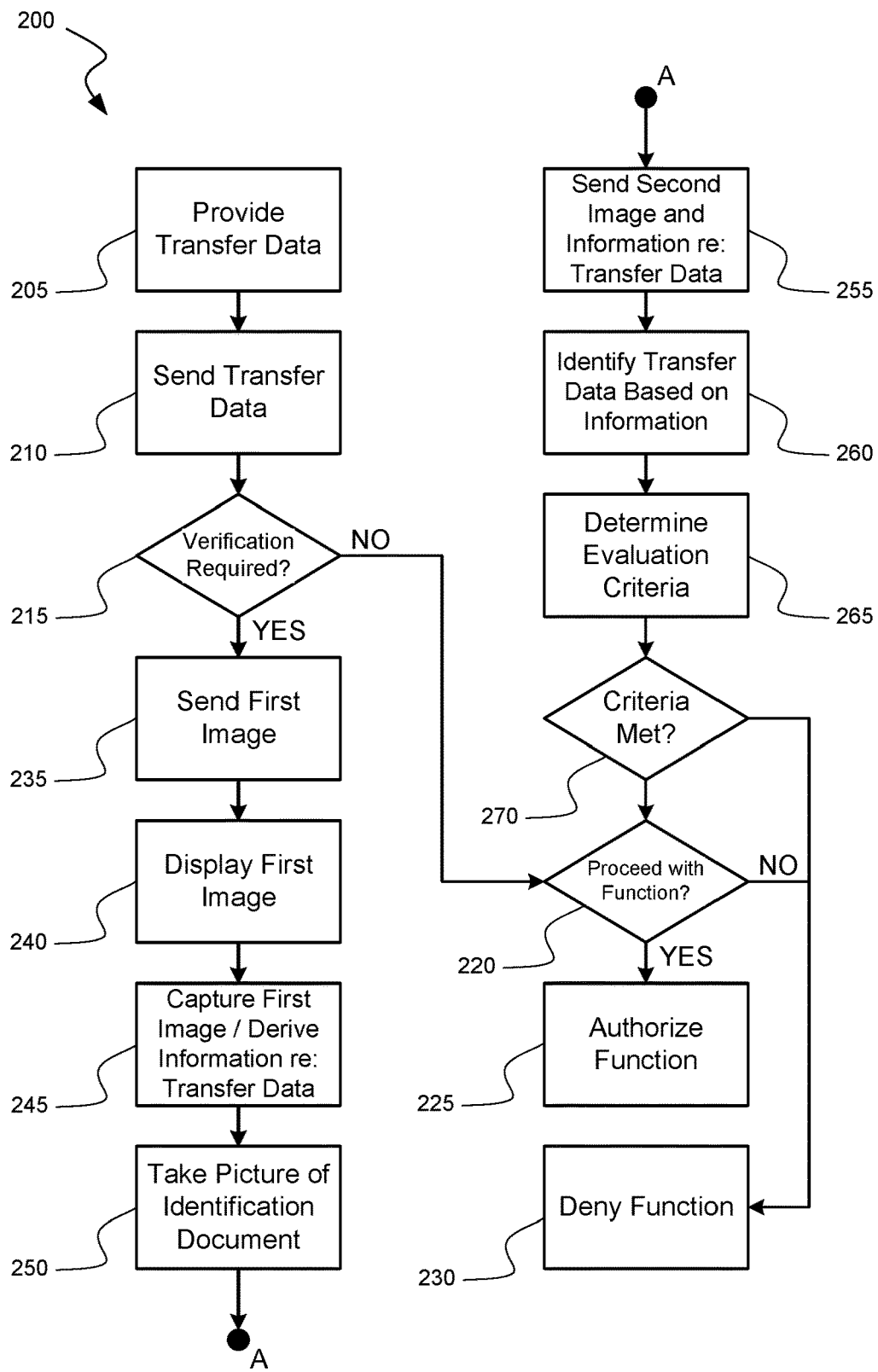
FIG. 2 is a block diagram of one method embodiment of the invention for capture of images used in identity verification and recordation.

FIG. 2 shows one method 200 of the invention for capture of images used in identity verification and recordation which employs system 100. At block 205, a person wishing to conduct a transaction with, or otherwise use, a service of system 100 provides at least some transfer data to remote terminal 120. An agent or remote terminal 120 may assist the person at this step, and may supplement the transfer data with additional information as necessary to complete the desired transaction.

Merely by way of example, one transaction service that may be provided by the system may be a money transfer. The person conducting the transaction may then, in this example, be a sender or receiver in such a transaction, either wishing to send funds to another person, or receive funds previously or in the future sent by the other person. The transfer data may consequently include sender, receiver, amount, currency, and other information necessary to conduct the money transfer.

At block 210, the transfer data is sent from remote terminal 120 to specialized processing device 110. At block 215, specialized processing device 110 analyzes the transfer data and determines whether or not an identity verification process is required to execute the function associated with the transfer data. This determination may be based on predefined rules which state that certain requested functions do, do not, or sometimes require an identity verification process. A predefined rule which states that a function sometimes require an identity verification process may base a final determination on the particulars of a given set of received transfer data.

Merely by way of example, in a financial transaction function, certain currency amounts, currency types, and/or geographic locations may trigger an identity verification process. Additionally, if the identity verification process has already occurred for an individual in the transfer data, and information pertaining thereto stored, the process may not be necessary.

If an identification verification process is not required, then method 100 proceeds to block 220 where specialized processing device 110 or some other device makes a determination of whether to authorize the function based on predefined parameters and the transfer data, and transmit an authorization instructing another system or person to proceed or not proceed with the requested function. In some embodiments, this authorization may also be, or only be, sent to remote terminal 120 for further processing of the attempted desired function. If the function is authorized, method 100 proceeds to block 225. If the function is not authorized, method 100 proceeds to block 230.

If, however, an identification verification process is required, then method 100 proceeds from block 215 to block 235, where specialized processing device 110 sends a first image file to remote terminal 120 for display thereat. The first image file may include a one-dimensional barcode or two-dimensional barcode (i.e., Quick Response Code™). Upon receipt of the first image file, remote terminal 120 may display the image in the contents of the first image file at block 240.

At block 245, an agent or user of remote terminal 120 may use mobile device 140, perhaps their own or a device provided by another entity, to take and store a picture of the displayed image using a camera or other imaging device of mobile device 140. The stored picture of the first image file may be analyzed by mobile device 140 to derive or determine information which identifies the transfer data with which the first image file is associated with. The first image file may be a one or two dimensional bar code, and bar code matching techniques known in the art may be used in various manners to accomplish this step. At block 250, the agent or user of remote terminal 120 also uses mobile device 140 to take and store a picture of identification document 160.

At block 255, mobile device 140 sends the information which identifies the transfer data with which the first image file is associated with, and the second image file of identification document 160, to specialized processing device 110. At block 260, specialized processing device 110, identifies which transfer data is referenced by the information derived from the first image file as provided by mobile device 140.

In some embodiments, instead of deriving information which identifies the transfer information from first image file at mobile device 140, such derivation could occur at specialized processing device 110 after a picture of the first image file is transmitted thereto. In either case, matching may occur via either direct image comparison or determining embedded information within the first image file to thereby identify the transfer data associated with the first image file. In this manner, the picture taken by mobile device 140 and the first image file are indirectly matched by determining that the embedded information in the second image file corresponds with the transfer data associated with the first image file.

At block 265, specialized processing device 110 determines criteria on which the third image file, and consequently identification document 160, will be evaluated. The criteria may, in some embodiments, be based on the transfer data, and what standards are required for the function desired to be processed by the transfer data.

For example, in some embodiments where the desired function is a money transfer, know-your-customer legal requirements may define minimum standards of the identification document 160 submitted in a particular scenario. For example, it may be required that identification document 160 is a government issued identification document 160, or that it include at least certain pieces of information. Optical character and image analysis may be employed to achieve these ends. Additionally, matching of certain data in the third image of identification document 160 may be required to match certain aspects of the transfer data (e.g., the person requesting a money transfer must match the person identified by identification document 160). Data from identification document 160 may also be checked against other local and/or remote first or third party stored databases.

At block 270, the specialized processing device 110 determines whether the third image file meets the determined criteria. If not, method 100 proceeds to block 230 where implementation of the desired function is denied. If the third image file does meet the determined criteria, then method 100 proceeds to block 220 for any other further evaluation of the transfer data which must be completed prior to authorizing the function at block 225. In any case, the images received from mobile device 140 may be stored and associated with transfer data and/or particular individual user/client files for future reference.

In some embodiments, variations in the above systems and methods may be present. Merely by way of example, in some embodiments, specialized processing device 110 may send the first image file to a mobile device of the sender involved in the transaction data, rather than to remote terminal 120. In these embodiments, a mobile application or other program on the sender's mobile device may be able to scan and/or interpret the first image file to determine information which identifies the transfer data with which the first image file is associated with. The sender's mobile device may also then be used to take a picture of identification document 160, and thereafter transmit the information which identifies the transfer data (derived from the first image file) along with the second image of identification document 160, to specialized processing device 110. This process could thereby occur wherever the sender is located. The transaction associated with the transfer data would then be completed normally by the agent at remote terminal 120, or elsewhere.

In other embodiments, hybrid versions of such an implementation may occur. For example, the first image file may still be sent by specialized processing device 110 to remote terminal 120, but the sender in the transaction, rather than the agent operating remote terminal 120, may supply mobile device 140. In such scenarios, the sender may allow the agent to use their mobile device 140 to take a picture of the displayed first image file. Then upon return of mobile device 140 to the sender, the sender can then take a picture of the necessary identification document 160 and send along with the information identifying the transfer data, to specialized processing device 110. The transaction associated with the transfer data would then be completed normally by the agent at remote terminal 120, or elsewhere. In other examples, mobile device 140 may be owned by any party, including the party operating specialized processing device 110.

Figure 3:
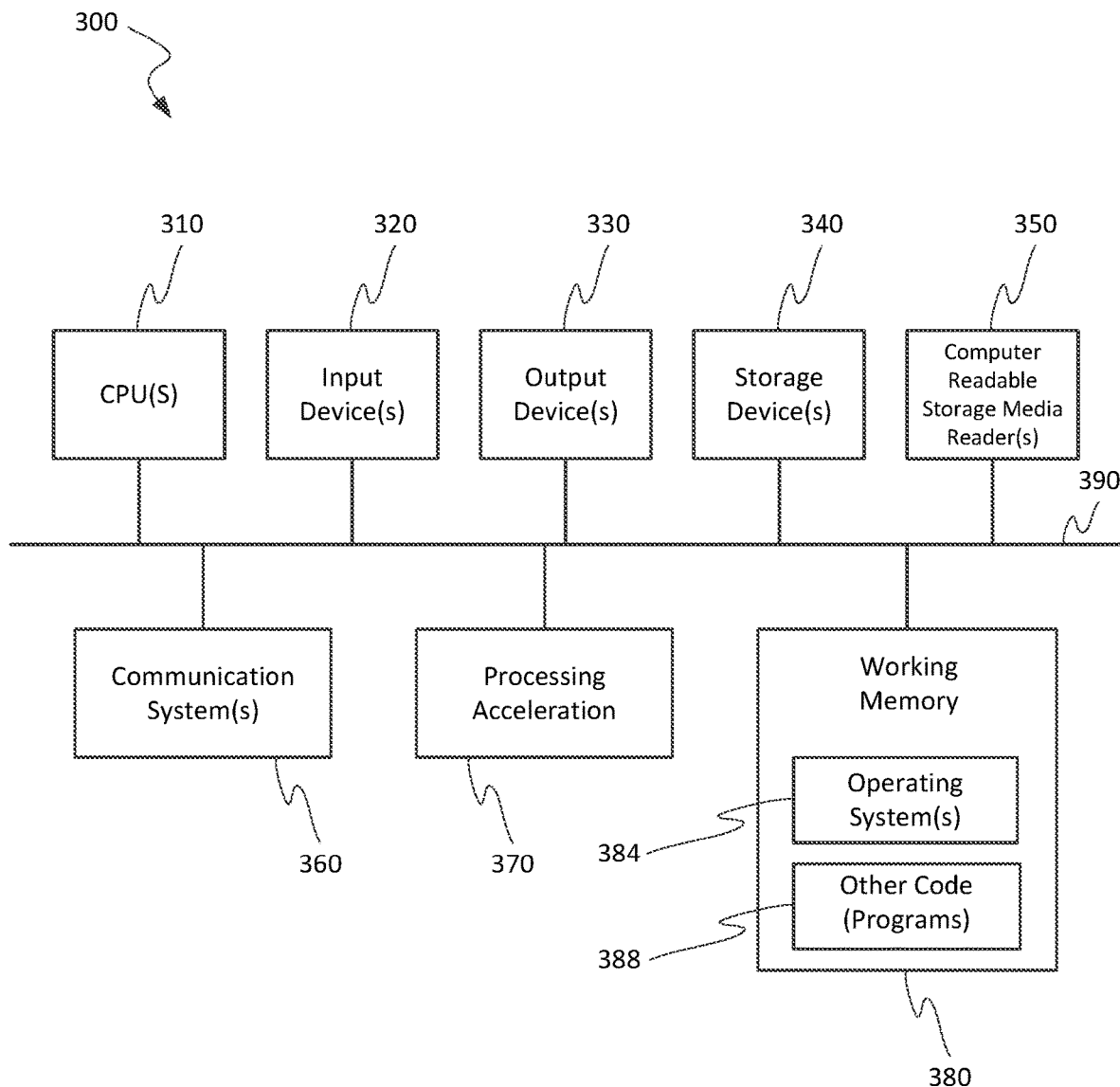
FIG. 3 is a block diagram of an exemplary computer system capable of being used in at least some portion of the apparatuses or systems of the present invention, or implementing at least some portion of the methods of the present invention.

FIG. 3 is a block diagram illustrating components of some computer systems 300 in which at least portions of embodiments of the present invention may be implemented. This example illustrates a computer system 300 such as may be used, in whole, in part, or with various modifications, to provide the functions of specialized processing device 110, remote terminal 120, communication network 130, mobile device 140, cellular network 150, and/or other components of embodiments of the invention such as those discussed above. For example, various functions of specialized processing device 110 may be controlled by the computer system 300, including, merely by way of example, determining whether identify verification is required, receiving images from mobile device 140, determining whether received images meet certain criteria, etc.

The computer system 300 is shown comprising hardware elements that may be electrically coupled via a bus 390. The hardware elements may include one or more central processing units 310, one or more input devices 320 (e.g., a mouse, a keyboard, etc.), and one or more output devices 330 (e.g., a display device, a printer, etc.). The computer system 300 may also include one or more storage device 340. By way of example, storage device(s) 340 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 350, a communications system 360 (e.g., a modem, a network card (wireless or wired), an infra-red communication device, Bluetooth™ device, cellular communication device, etc.), and working memory 380, which may include RAM and ROM devices as described above. In some embodiments, the computer system 300 may also include a processing acceleration unit 370, which can include a digital signal processor, a special-purpose processor and/or the like.

The computer-readable storage media reader 350 can further be connected to a computer-readable storage medium, together (and, optionally, in combination with storage device(s) 340) comprehensively representing remote, local, fixed, and/or removable storage devices plus storage media for temporarily and/or more permanently containing computer-readable information. The communications system 360 may permit data to be exchanged with a network, system, computer and/or other component described above.

The computer system 300 may also comprise software elements, shown as being currently located within a working memory 380, including an operating system 384 and/or other code 388. It should be appreciated that alternate embodiments of a computer system 300 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 300 may include code 388 for implementing any or all of the function of the various elements of the architecture as described herein. For example, software, stored on and/or executed by a computer system such as system 300, can provide the functions of specialized processing device 110, remote terminal 120, communication network 130, mobile device 140, cellular network 150, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A method for capturing an image for identity verification and recordation, the method comprising:
   receiving, at a specialized processing device, transfer data from a remote terminal;
   determining, with the specialized processing device, based on the transfer data, that an identity verification process is required to execute the transfer data;
   based on the determination that an identity verification process is required to execute the transfer data, generating, by the specialized processing device, a first image file comprising a barcode encoding data associated with the transfer data;
   transmitting, from the specialized processing device, the first image file to the remote terminal for display at the remote terminal;
   receiving, at the specialized processing device from a mobile device, the transfer data decoded from the first image file associated with the transfer data, and a second image file corresponding to an image of an identification document;
   determining, with the specialized processing device, whether the received second image file meets at least one predefined criteria associated with the received transfer data decoded from the first image file; and
   transmitting, from the specialized processing device, an authorization signal in response to a determination by the specialized processing device that the received second image file meets the at least one predefined criteria associated with the received transfer data.

2. The method for capturing an image for identity verification and recordation of claim 1, the method further comprising:
   storing, by the specialized processing device, the second image file in association with the transfer data.

3. The method for capturing an image for identity verification and recordation of claim 1, wherein:
   the mobile device is configured to decode the transfer data from the first image file by converting graphical elements of the first image file into characters.

4. The method for capturing an image for identity verification and recordation of claim 3, wherein the generating the first image file comprises generating a two-dimensional Quick Response code barcode encoding the transfer data.

5. The method for capturing an image for identity verification and recordation of claim 1, the method further comprising:
   determining, with the specialized processing device, the predefined criteria based at least in part on the transfer data.

6. The method for capturing an image for identity verification and recordation of claim 1, wherein the determining whether the received second image file meets the at least one predefined criteria associated with the received transfer data comprises:
   determining whether the second image file includes a sub-image of a government issued identification document; and
   in response to determining that the second image file includes a sub-image of a government issued identification document, determining whether the government issued identification document corresponds to the transfer data.

7. The method for capturing an image for identity verification and recordation of claim 1, wherein the remote terminal and the mobile device are separate and independent computing devices, wherein transmitting the first image file comprises transmitting the first image file over a first Internet Protocol network to the remote terminal, and wherein the data associated with the transfer data and the second image file are received from the mobile device via a second wireless network.

8. A system for capturing an image for identity verification and recordation, the system comprising:
   a specialized processing device configured to at least:
      receive transfer data from a remote terminal;
      determine, based on the transfer data, that an identity verification process is required to execute the transfer data;
      based on the determination that an identity verification process is required to execute the transfer data, generate a first image file comprising a barcode encoding data associated with the transfer data;
      transmit the first image file to the remote terminal for display at the remote terminal;
      receive from a mobile device, the transfer data decoded from the first image file associated with the transfer data and a second image file corresponding to an image of an identification document;
      determine whether the received second image file meets at least one predefined criteria associated with the received transfer data decoded from the first image file; and
      transmit an authorization signal in response to a determination by the specialized processing device that the received second image file meets the at least one predefined criteria associated with the received transfer data.

9. The system for capturing an image for identity verification and recordation of claim 8, wherein the specialized processing device is further configured to at least:
   store the second image file in association with the transfer data.

10. The system for capturing an image for identity verification and recordation of claim 8, wherein:
   the mobile device is configured to decode the transfer data from the first image file by converting graphical elements of the first image file into characters.

11. The system for capturing an image for identity verification and recordation of claim 10, wherein the generating the first image file comprises generating a two-dimensional Quick Response code barcode encoding the transfer data.

12. The system for capturing an image for identity verification and recordation of claim 8, wherein the specialized processing device is further configured to at least:
   determine the predefined criteria based at least in part on the transfer data.

13. The system for capturing an image for identity verification and recordation of claim 8, wherein the determining whether the received second image file meets the at least one predefined criteria associated with the received transfer data comprises:
   determining whether the second image file includes a sub-image of a government issued identification document; and
   in response to determining that the second image file includes a sub-image of a government issued identification document, determining whether the government issued identification document corresponds to the transfer data.

14. The system for capturing an image for identity verification and recordation of claim 8, wherein the remote terminal and the mobile device are separate and independent computing devices, wherein transmitting the first image file comprises transmitting the first image file over a first Internet Protocol network to the remote terminal, and wherein the data associated with the transfer data and the second image file are received from the mobile device via a second wireless network.

15. A non-transitory, machine-readable medium having instructions stored thereon for capturing an image for identity verification and recordation, wherein the instructions are executable by at least one processor to at least:
   receive transfer data from a remote terminal;
   determine, based on the transfer data, that an identity verification process is required to execute the transfer data;
   based on the determination that an identity verification process is required to execute the transfer data, generate a first image file comprising a barcode encoding data associated with the transfer data;
   transmit the first image file to the remote terminal for display at the remote terminal;
   receive, from a mobile device, the transfer data decoded from the first image file associated with the transfer data and a second image file corresponding to an image of an identification document;
   determine whether the received second image file meets at least one predefined criteria associated with the received transfer data decoded from the first image file; and
   transmit an authorization signal in response to a determination by a specialized processing device that the received second image file meets the at least one predefined criteria associated with the received transfer data.

16. The non-transitory, machine-readable medium having instructions stored thereon of claim 15, wherein:
   the mobile device is configured to decode the transfer data from the first image file by converting graphical elements of the first image file into characters.

17. The non-transitory, machine-readable medium having instructions stored thereon of claim 16, wherein the generating the first image file comprises generating a two-dimensional Quick Response code barcode encoding the transfer data.

18. The non-transitory, machine-readable medium of claim 15, wherein the instructions are further executable by at least one processor to at least:
   determine the predefined criteria based at least in part on the transfer data.

19. The non-transitory, machine-readable medium of claim 15, wherein the determining whether the received second image file meets the at least one predefined criteria associated with the received transfer data comprises:
   determining whether the second image file includes a sub-image of a government issued identification document; and
   in response to determining that the second image file includes a sub-image of a government issued identification document, determining whether the government issued identification document corresponds to the transfer data.

20. The non-transitory, machine-readable medium of claim 15, wherein the remote terminal and the mobile device are separate and independent computing devices, wherein transmitting the first image file comprises transmitting the first image file over a first Internet Protocol network to the remote terminal, and wherein the data associated with the transfer data and the second image file are received from the mobile device via a second wireless network.

\* \* \* \* \*